US009280760B2

(12) United States Patent
Alexandrov et al.

(10) Patent No.: US 9,280,760 B2
(45) Date of Patent: Mar. 8, 2016

(54) INTEGRATED ONLINE WORKSPACES

(71) Applicant: CITRIX SYSTEMS, INC., Fort Lauderdale, FL (US)

(72) Inventors: Albert Alexandrov, Goleta, CA (US); Bernd Oliver Christiansen, Santa Barbara, CA (US); Kris Niles, Mt. Shasta, CA (US); Mark Bishop, Concord, NH (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 271 days.

(21) Appl. No.: 13/661,997

(22) Filed: Oct. 26, 2012

(65) Prior Publication Data

US 2013/0111362 A1 May 2, 2013

Related U.S. Application Data

(60) Provisional application No. 61/551,919, filed on Oct. 26, 2011.

(51) Int. Cl.
G06F 3/048 (2013.01)
G06Q 10/10 (2012.01)
H04L 12/18 (2006.01)

(52) U.S. Cl.
CPC ............ *G06Q 10/10* (2013.01); *H04L 12/1818* (2013.01)

(58) Field of Classification Search
USPC .......................................... 715/753; 709/204
See application file for complete search history.

(56) References Cited

U.S. PATENT DOCUMENTS

| 6,961,908 | B2* | 11/2005 | Phillips .......................... 715/839 |
| 8,370,432 | B2* | 2/2013 | Digate et al. .................. 709/204 |
| 2004/0003040 | A1* | 1/2004 | Beavers et al. ............... 709/204 |
| 2004/0081295 | A1 | 4/2004 | Brown et al. |
| 2006/0031779 | A1 | 2/2006 | Theurer et al. |
| 2007/0011233 | A1* | 1/2007 | Manion et al. ................ 709/204 |
| 2007/0288562 | A1 | 12/2007 | Shaffer et al. |
| 2008/0016156 | A1* | 1/2008 | Miceli et al. .................. 709/204 |
| 2009/0192845 | A1* | 7/2009 | Gudipaty et al. .................. 705/7 |
| 2011/0271332 | A1* | 11/2011 | Jones et al. ........................ 726/7 |

FOREIGN PATENT DOCUMENTS

| KR | 10 2010 0016732 A | 2/2010 |
| KR | 10 2011 0066603 A | 6/2011 |

* cited by examiner

*Primary Examiner* — Matthew Ell
(74) *Attorney, Agent, or Firm* — BainwoodHuang (57) ABSTRACT

Systems and methods for providing a workspace are disclosed. In some aspects, a server provides, to a client computing device, access to a workspace, the workspace including one or more members and one or more content items, in response to verifying that the client computing device is associated with one of the one or more members of the workspace. The server provides, to the client computing device, within a display associated with the workspace, a first user interface element to initiate an online meeting with a first portion of the one or more members of the workspace or a second user interface element to join an ongoing online meeting with a second portion of the one or more members.

21 Claims, 5 Drawing Sheets

INTEGRATED ONLINE WORKSPACES

CROSS-REFERENCE TO RELATED APPLICATIONS

The present application claims the benefit of priority under 35 U.S.C. §119 from U.S. Provisional Patent Application Ser. No. 61/551,919 entitled "INTEGRATED VIRTUAL WORKSPACES," filed on Oct. 26, 2011, which is hereby incorporated by reference in its entirety for all purposes.

FIELD OF THE DISCLOSURE

This disclosure relates generally to remotely providing resources to an end user. In particular, this disclosure relates to integrating online meeting resources with remote data resources in an online workspace such that an end user can access either type of resource within the online workspace.

BACKGROUND

Multiple users may participate in online meetings, for example, via videoconferencing. During the online meetings, a presenter may show text or images from a file, for example, a slide show presentation. However, in order to provide the file to the other users, the presenter may need to send a separate electronic message attaching the file.

SUMMARY

In some aspects, a computer-implemented method for providing a workspace is disclosed. The method includes providing, to a client computing device, access to a workspace, the workspace including one or more members and one or more content items, in response to verifying that the client computing device is associated with one of the one or more members of the workspace. The method includes providing, to the client computing device, within a display associated with the workspace, a first user interface element to initiate an online meeting with a first portion of the one or more members of the workspace or a second user interface element to join an ongoing online meeting with a second portion of the one or more members.

In some aspects, a non-transitory computer-readable medium for providing a workspace is disclosed. The computer-readable medium includes instructions. The instructions include code for providing, to a client computing device, access to a workspace, the workspace including one or more members and one or more content items, in response to verifying that the client computing device is associated with one of the one or more members of the workspace. The instructions include code for providing, to the client computing device, within a display associated with the workspace, a first user interface element to initiate an online meeting with a first portion of the one or more members of the workspace or a second user interface element to join an ongoing online meeting with a second portion of the one or more members.

In some aspects, a system for providing a workspace is disclosed. The system includes processing hardware and a memory. The memory includes instructions. The instructions include code for providing, to a client computing device, access to a workspace, the workspace including one or more members and one or more content items, in response to verifying that the client computing device is associated with one of the one or more members of the workspace. The instructions include code for providing, to the client computing device, within a display associated with the workspace, a first user interface element to initiate an online meeting with a first portion of the one or more members of the workspace or a second user interface element to join an ongoing online meeting with a second portion of the one or more members.

BRIEF DESCRIPTION OF DRAWINGS

The following figures depict certain illustrative embodiments of the methods and systems described herein, where like reference numerals refer to like elements. Each depicted embodiment illustrates these methods and systems and in no way limits either the methods or the systems.

DETAILED DESCRIPTION

As set forth above, multiple users may participate in online meetings, for example, via videoconferencing. During the online meetings, a presenter may show text or images from a file, for example, a slide show presentation. However, in order to provide the file to the other users, the presenter may need to send a separate electronic message attaching the file. As the foregoing illustrates, a new approach for sharing files during an online meeting or an online meeting may be desirable.

Figure 1:
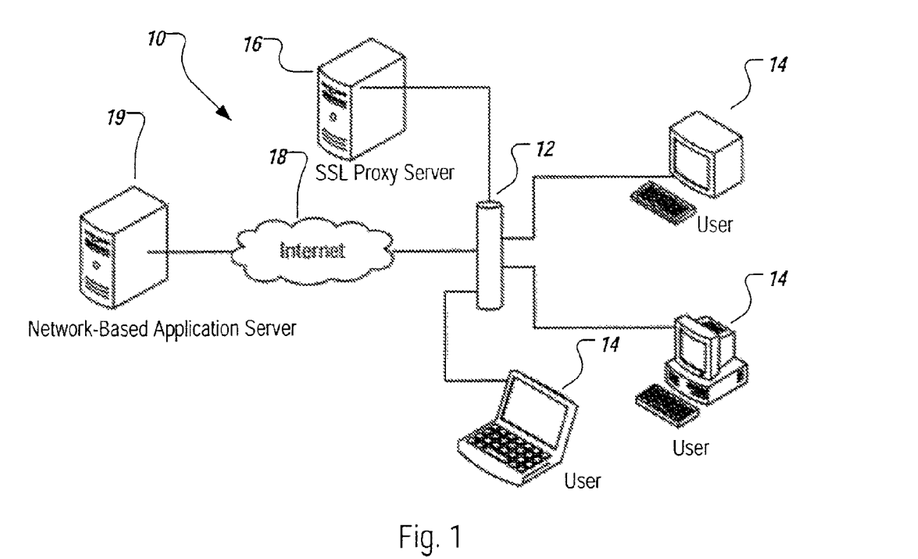
FIG. 1 is a block diagram illustrating an example embodiment of a distributed computing system.

An embodiment of a distributed computing environment 10 is depicted in FIG. 1. The environment 10 comprises a local network or domain 12 of users 14. On the local network 12 is a secure socket layer (SSL) proxy server 16. The local network 12 is connected to an unsecure network, such as the Internet 18. A network-based application service 19 is also connected to the Internet 18.

Web security gateways, such as SSL proxy server 16, are employed by a growing number of enterprises to mitigate risks associated with malware, sensitive data threat/leakage, and unauthorized access to objectionable Internet content or applications. Some of these gateways 16 intercept outbound connection requests and serve as a middle man between a client 14 and target 19. In doing so, the gateways 16 return a security certificate signed by a trusted, internal certificate authority. For example, an SSL proxy server 16 intercepts outbound SSL connection requests, generates "spoofed," replacement SSL server certificates which it returns to the requester 14, and then establishes a second SSL connection to the target server 19 identified in the request. The spoofed certificate is signed by an internal certificate authority that the enterprise controls. As long as the client 14 trusts the internal certificate authority, the security gateway 16 can act as a so-called "man in the middle" and inspect the plaintext traffic between the client 14 and target server 19.

Figure 2:
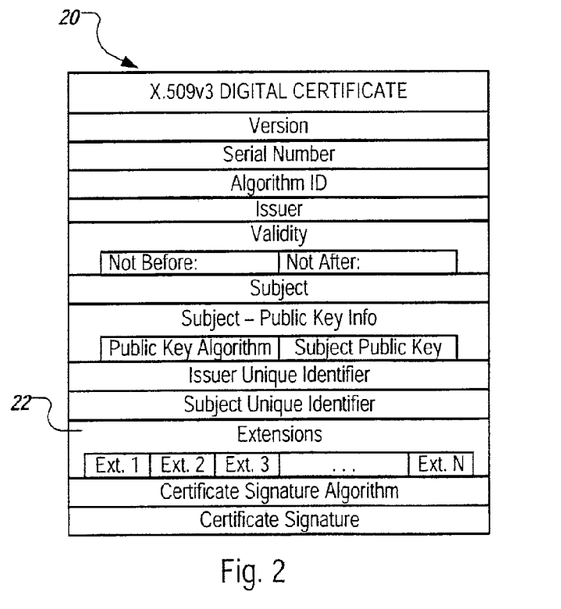
FIG. 2 is a block diagram illustrating an example embodiment of an online workspace.

These security certificates may be used to communicate local-IT administrators' policies for a particular network-based application available at a network-based application service 19 to clients 14 seeking access to the network-based application. As used herein, "network-based application"

broadly refers to any application that uses information received from a network to operate. Digital security certificates are not limited to distributing only cryptographic information. For example, as illustrated in FIG. 2, an X.509v3 digital certificate 20 may optionally include one or more extensions 22 in its structure. These extensions 22 may be used to transmit data with the certificate 20. Ordinarily, in prior art systems, extensions 22 are used to distribute information about the certificate 20 itself, not for regulating policies regarding applications that may use the certificate 20. If the security gateway 16 adds application-specific extensions 22 in an X.509v3 digital certificate 20 profile when creating a replacement certificate to send to a client 14, then the client 14 has an opportunity to receive, validate, and act on this digitally-signed information. The information provided in these application-specific extensions 22 may be policy information that a browser or proprietary software application can interpret. More information on security certificates and extensions may be found in the Internet Engineering Task Force's (IETF) Request For Comments (RFC) 5280, entitled "Internet X.509 Public Key Infrastructure Certificate and Certificate Revocation List (CRL) Profile," from May 2008, which is incorporated in its entirety by reference herein. Thus, a trusted security certificate returned from an internal certificate authority can double as a distributor for policies regulating permissions granted to a network-based application for which the certificate was issued. In other words, functionality of a network-based application may be restricted through the SSL proxy process.

In various embodiments, the network-based application's client-side software is configured to detect and parse information included in a security certificate. The code is also adapted to communicate the policy conveyed in the certificate 20 to the application security layer in the client 14 for interpretation and enforcement. The client-side software is also able to accept and trust local certificate authorities either by accessing a local certificate store on the client computer or through additional logic and GUI elements to confirm acceptance of non-standard certificate authority root certificates by the user, e.g., such as exists within standard Internet browsers.

The following is a work flow example of an embodiment of the present disclosure. A user 14 directs its browser towards an on-line presentation application's server 19. The user 14 then downloads from the server 19 client software to run the on-line presentation. The user 14 next attempts to establish an SSL connection to an on-line presentation server. When initiating its outbound SSL communications with the on-line presentation server, the client software expects to receive a valid security certificate in response. A local SSL proxy server 16 intercepts the SSL connection request and establishes a connection with the on-line presentation server. The SSL proxy server 16 also returns a replacement certificate 20 in response to the outbound connection request. Because the certificate 20 is signed by a local certificate authority, the client 14 trusts the contents of the certificate 20. The certificate 20 includes policy information, stored in an extension 22 of the certificate, for identifying the rights and capabilities of the on-line presentation software running on the client computer 14. For example, in environments that prohibit presenting or giving remote control to a local computer's desktop to outside computers, if the certificate 20 includes appropriately encoded policy information along the lines of "On-Line Presentation Software—No Share Desktop" or "On-Line Presentation Software—No Remote Control," then the local IT security staff could allow employees to use the on-line presentation software with the desired functionality restrictions needed to comply with local policy. Accordingly, the on-line presentation software operates according to the restrictions and permissions identified in the security certificate.

Use of security certificates is beneficial because an internal certificate authority is a central place for IT to distribute updated policies to any machine on a domain that is seeking access to a particular network-based application. Because these systems already have a gateway for intercepting SSL requests and transmitting replacement certificates, it is beneficial to take advantage of these replacement certificates to simultaneously distribute policies to regulate the use of network-based applications with entities outside of a local, trusted domain.

For IT staff that are inclined to implement many web security controls at these security gateways, this method provides an advantage over, say, using Windows registry settings to signal policy to the application client. It also does not require IT staff to contact each network-based application vendor to request manually blocking or hobbling client functionality based on the requesting IP address. For vendors of security gateways and SSL-inspecting proxies in particular, this systems and methods disclosed herein provide a way to enhance the value of products to customers and better accommodate the needs of mutual customers.

Aspects of this disclosure are compatible with any browser or software client that has functionality distributed outside a local domain. A local computer will operate according to the policies identified in the trusted security certificate received from its local security certificate authority. For example, a digital security certificate may include a policy that prohibits the execution of various multimedia platforms, including Adobe Systems Inc.'s ADOBE FLASH PLAYER.

Various embodiments of this disclosure may be used to distribute domain-specific policies for downloading content or programs from servers outside of the domain by way of security certificates. In yet other embodiments, security certificates may be used to distribute domain-specific policies to regulate viewing and listening of streaming video or audio websites. The systems and methods disclosed herein are not limited to the examples disclosed, but are applicable to regulating domain-specific policies in instances where a security certificate is distributed.

FIG. 1 illustrates one example of a network system and FIG. 2 illustrates one example of a certificate. However, the subject technology may be implemented in other network systems and with other certificates. Some implementations of the subject technology do not require the use of certificates.

Figure 3:
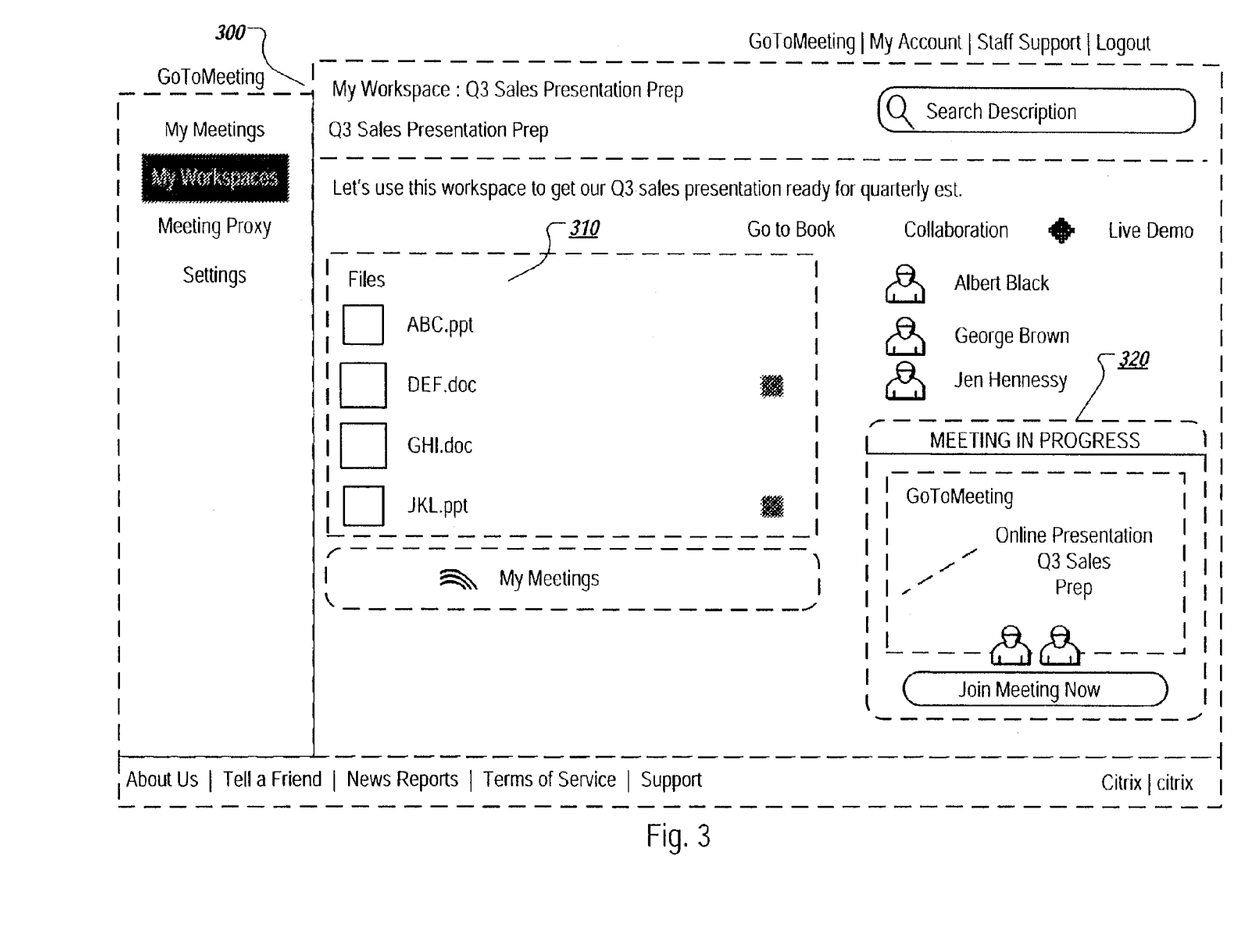
FIG. 3 illustrates an example online workspace that includes both remote resources and a video or graphical representation of an online meeting.

FIG. 3 illustrates an online workspace 300 that combines both remote resources 310 and a video or graphical representation of an online meeting 320. The online workspace 300, in some embodiments, can be a website or online content accessed via a browser or similar application. In some instances the online workspace 300 can be software delivered as a service through another application such as a browser.

As used herein, the phrase "online meeting" encompasses its plain and ordinary meaning including, but not limited to a real-time or quasi-real time communication via a network including oral or text communication between one or more participants. In some cases, an online meeting can involve one or more of text messaging, audio conferencing, video conferencing, or screen sharing. As used herein, the phrase "screen sharing" encompasses its plain and ordinary meaning including, but not limited to providing all or a portion of a screen display at a first client computing for viewing via a second client computing device. The second client computing device communicates with the first client computing device via a network and may be remote from the first client computing device.

The online workspace 300 can in some embodiments display links or graphical representations of remote resources 310. These resources can sometimes be data or files. In other instances, these resources can be any of the following: desktops, applications, data, files, services, virtual machines, hypervisors, or any other type of electronic resource. Remote resources 310 can be stored on one or more computers or in one or more types of storage repositories. For example, remote resources 310 can be stored on an application server, a data server, an appliance or any other computing device capable of storing and/or executing a resource.

A graphical representation of a remote resource can comprise any number of elements such as: graphic, text, hyperlink or other electronic marking. In some embodiments, the graphical representation can be an active control used to access or execute the remote resource. In some aspects, one or more of the resources 310 can include one or more of a comment stream, multiple versions, a history of edits, a date or time of modification, etc.

The online meeting can be represented by a graphical representation of the meeting 320. This graphical representation 320 can comprise an image of the presentation screen shown during the meeting as well as a list of the meeting attendees. In other embodiments, the graphical representation 320 can include the meeting information (e.g. title, call information, attendees, etc.) and a graphical representation of a shared presentation screen as well as webcam output displayed during the meeting. In still other embodiments, the graphical representation 320 can include a link or control that when selected or activated plays the audio from the meeting.

In other embodiments, the online meeting can be represented by a video representation of the meeting. The video representation can display substantially real-time video of the content of the meeting. This content can include the displayed content of a shared presentation screen. The content can further include any of the following: an audio stream of phone and VOIP audio played during the meeting, meeting details, webcam output displayed during the meeting, meeting statistics, or any other information able to be represented through a video display.

In some embodiments, the online meeting can be represented within the online workspace 300 using any combination of video, graphics and text. The representation 320 of the online meeting within the online workspace 300 can provide a user with the ability to either request to join a meeting or join a meeting. Joining a meeting can include entering an online meeting such as a meeting held using Citrix GoToMeeting or GoToWebinar, or dropping into a meeting by viewing the video and listening to the audio output from the meeting. Joining a meeting can also include viewing meeting materials associated with a particular meeting including: an agenda, files associated with the meeting, meeting details, a meeting attendee list, or any other meeting materials.

The online workspace 300 can comprise any number of virtual resources and any number of graphical or video representations of online meetings. In some embodiments, resources and meetings are displayed within a particular user's online workspace 300 based on any of the following criteria: a configuration setting managed by the user, whether the user belongs to a particular workgroup, the user has requested to view the meeting, or any other criteria whereby the user is permitted to view the content of a particular meeting.

While FIG. 3 illustrates, one example of a specific workspace 300, the subject technology may be implemented with other workspace(s) having different layouts, different users, different titles, different descriptions, etc.

Figure 4:
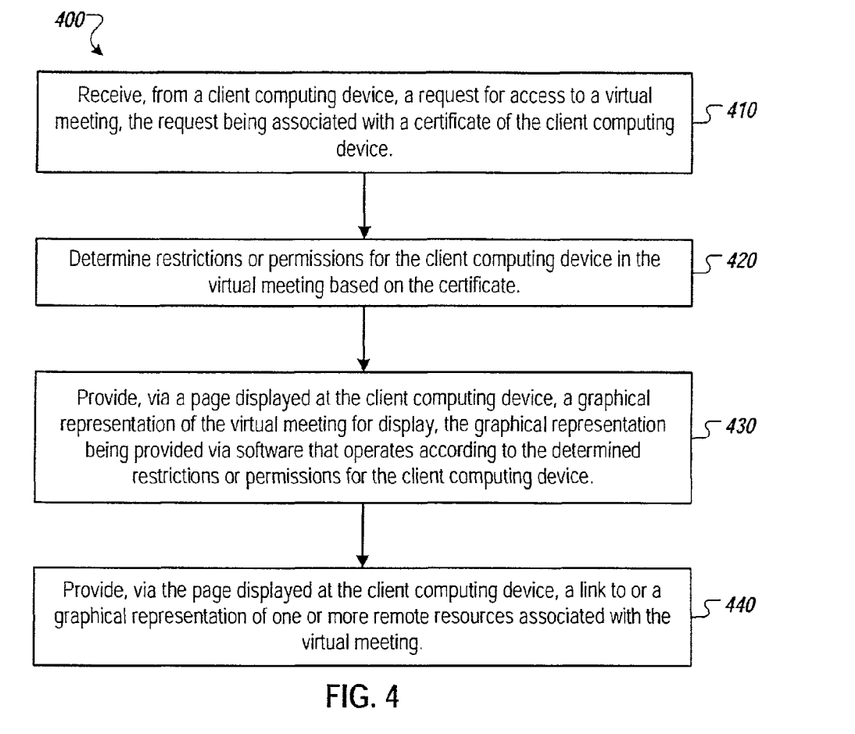
FIG. 4 is a flow chart illustrating a first example process for providing a workspace.

FIG. 4 is a flow chart illustrating a first example process 400 for providing a workspace.

The process 400 begins at step 410, where a server (e.g., network-based application service 19) receives, from a client computing device (e.g., user device 14), a request to access an online meeting. The request is associated with a certificate of the client computing device. In some aspects, the request can include a uniform resource locator (URL) of a webpage for the meeting, or opening an application (e.g., a web browser or other application) and entering an identifier of the meeting. The client computing device can be one of multiple client computing devices (e.g., multiple user devices 14) accessing the page for participation in the online meeting, as there may be multiple participants in the online meeting, each of whom has his/her own client computing device. In some aspects, the client computing device is an enterprise device and the certificate is generated via a proxy server (e.g., SSL proxy server 16) of the enterprise.

In step 420, the server determines restrictions or permissions for the client computing device in the online meeting based on the certificate. The restrictions or permissions for the client computing device can include, for example, restrictions or permissions for sharing a desktop of the client computing device or restrictions or permissions for remotely controlling of online meeting software from the client computing device.

In step 430, the server provides, via a page (e.g., online workspace 300, which may correspond to a webpage in a web browser or a page in another application) displayed at the client computing device, a graphical representation (e.g., online meeting representation 320) of the online meeting for display. The graphical representation is provided via software (e.g., software residing on the server or software residing on the client computing device) that operates according to the determined restrictions or permissions for the client computing device. In some aspects, the graphical representation includes an image of a presentation screen and a list of attendees of the online meeting. In some aspects, the graphical representation includes a video representation of the online meeting. In some aspects, the graphical representation of the online meeting includes text of the online meeting, for example text messages exchanged during the online meeting using a chat program within the online meeting or an automatic transcription of audio of the online meeting.

In step 440, the server provides, via the page displayed on the client computing device, a link to or a graphical representation of one or more remote resources associated with the online meeting (e.g., remote resources 310). The one or more remote resources can include one or more of a desktop, an application, a file, a service, a virtual machine, or a hypervisor.

In some aspects, the page can include representations of multiple online meetings (e.g., two online meetings, three online meetings, or more than three online meetings) and links to or graphical representations of plural remote resources associated with all or a portion of the multiple online meetings. After step 400, the process 400 ends.

Figure 5:
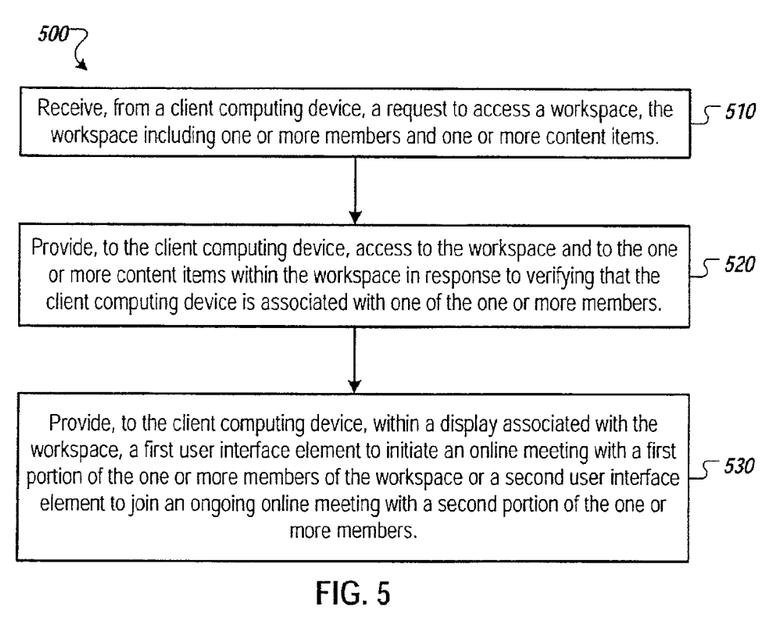
FIG. 5 is a flow chart illustrating a second example process for providing a workspace.

FIG. 5 is a flow chart illustrating a second example second process 500 for providing a workspace.

The process 500 begins at step 510, where a server receives, from a client computing device, a request to access a workspace. The workspace includes one or more members and one or more content items (e.g., files). An example of a workspace (workspace 300) is illustrated in FIG. 3. According to some examples, a user of a client computing device may log into a workspace, accessible via a web browser, by providing a user identifier and a password.

In step 520, the server provides, to the client computing device, access to the workspace and to the one or more content items within the workspace in response to verifying that the client computing device is associated with one of the one or more members. For example, the server can verify a user identifier and a password associated with the one or more members.

In step 530, the server provides, to the client computing device, within a display associated with the workspace (e.g., in a web browsers or in a special-purpose application executing on a mobile device or tablet computer), a first user interface element (e.g., a link or a button) to initiate an online meting with a first portion of the one or more members (e.g., all or a subset of the member(s) who are presently accessing the workspace) of the workspace or a second user interface element (e.g., a link or a button) to join an ongoing online meeting with a second portion of the one or more members. The second user interface element can be coupled with a thumbnail of a screen sharing view, a thumbnail of a video view, or a thumbnail of a webcam view from the ongoing online meeting. The thumbnail(s) can correspond to the graphical representation of the online meeting 320 of FIG. 3. The thumbnail(s) can be still image snapshot(s) or updating sequence(s) of snapshots. In the updating sequence, the snapshots can be updated, for example, 60 times per second or 120 times per second. If there are multiple ongoing online meetings, the workspace can include multiple user interface elements to join multiple ongoing online meetings.

The second user interface element to join the ongoing online meeting can be coupled with a graphical representation of the discussion topic(s) of the online meeting. The graphical representation of the discussion topic(s) can include data from the one or more files in the workspace or text from the ongoing online meeting. The graphical representation of the discussion topic(s) can be a video representation. The second user interface element to join the ongoing online meeting can be coupled with a graphical representation (e.g., a video representation) of one or more attendees of the ongoing online meeting. In some aspects, the graphical representation corresponds to the graphical representation of the online meeting 320 of FIG. 3. After step 530, the process 500 ends.

Some aspects of the subject technology can be implemented as follows. A workspace (e.g., using Podio®) may be provided. As used herein, the term "workspace" encompasses its plain and ordinary meaning including, but not limited to a webpage, web application, or other online or virtual data structure for users to collaborate asynchronously. For example, the users can upload files, write comments, etc. The Workspace has members. The members are users who can access the workspace (e.g., workspace 300 of FIG. 3). The members can decide to initiate a real-time online meeting tool (e.g., GoToMeeting®) while accessing the workspace using user interface elements provided with the workspace.

In one example, a Workspace has Albert, Bernd, and Mark as members. While accessing the workspace, Albert can start an online meeting with Bernd. Other members of the workspace (e.g., Mark), when accessing the workspace, are notified of any ongoing online meetings inside the workspace. For example, when Mark accesses the workspace, a user interface element is presented to Mark indicating that there is an ongoing meeting. The notification of the ongoing meeting to Mark can be visual, similar to looking through a window in a conference room. In some examples, Mark is presented with a graphical representation of the ongoing online meeting 320 (e.g., a thumbnail) as depicted in FIG. 3. Mark or other members can join the online meeting by selecting (e.g., clicking or touching) the notification.

Figure 6:
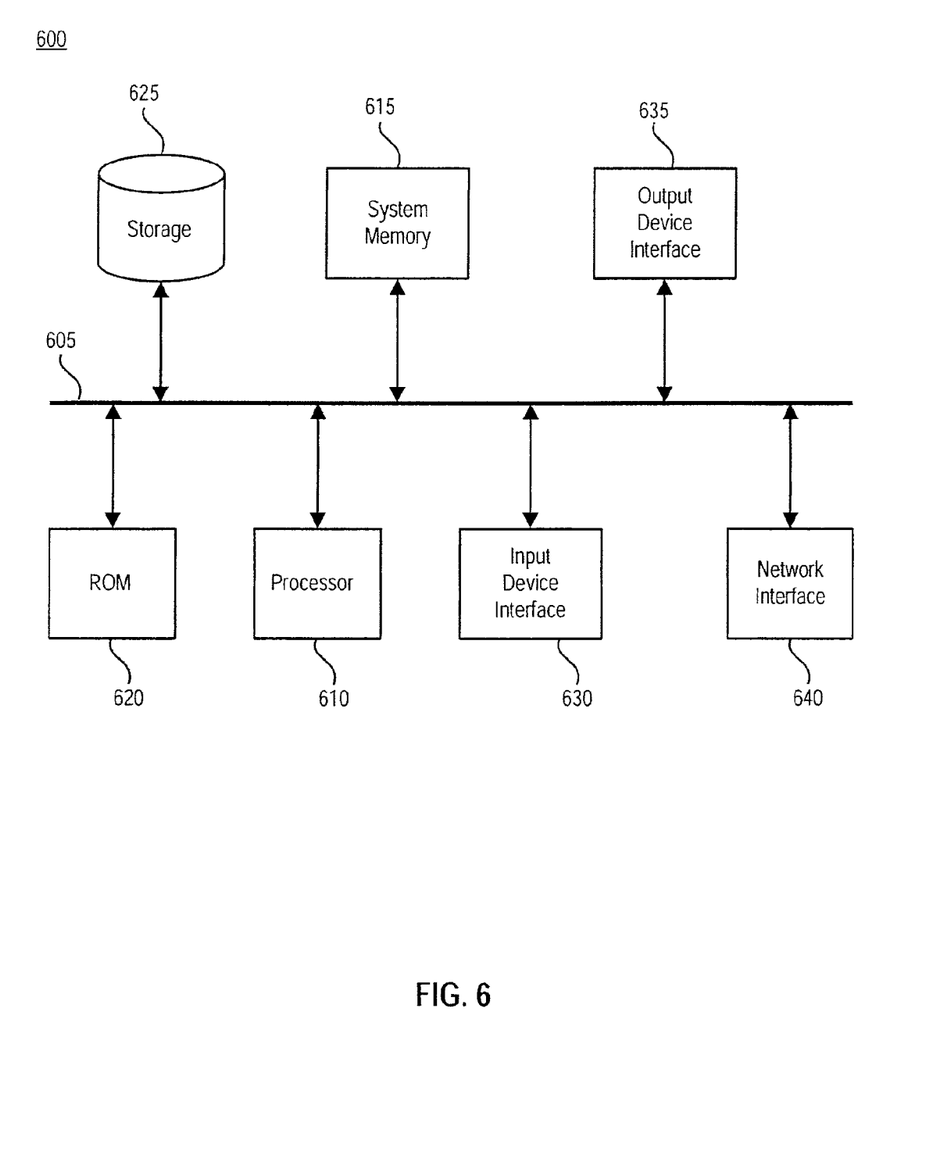
FIG. 6 conceptually illustrates an example electronic system with which some implementations of the subject technology are implemented.

FIG. 6 conceptually illustrates an electronic system 600 with which some implementations of the subject technology are implemented. For example, one or more of the user device 14, the SSL proxy server 16, or the network-based application server 19 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for providing a workspace for a online meeting in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touch screen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present disclosure.

Although the present disclosure has been described with reference to specific details, it is not intended that such details should be regarded as limitations upon the scope of the disclosure, except as and to the extent that they are included in the accompanying claims.

What is claimed is:

1. A computer-implemented method for providing a workspace, the method comprising:
   providing, to a client computing device, access to a workspace, the workspace comprising one or more members and one or more content items, the workspace being a first web-delivered shared environment for the members of the workspace to collaborate asynchronously by sharing access to the content items, the access being provided in response to verifying that the client computing device is associated with one of the one or more members of the workspace;
   providing, to the client computing device, a workspace display associated with the workspace, the workspace display including (1) a representation of remote resources of the workspace including the content items, (2) a representation of the members of the workspace, and (3) a representation of meeting resources for online meetings that can be initiated and joined by the one member via the workspace display, the online meetings provided by an online meeting tool in a second web-delivered shared environment providing real-time video and/or audio interaction among online meeting participants, the representation of the meeting resources in the workspace display being connected to receive online meeting information from the second web-delivered shared environment and including (a) in a first operating condition, a first user interface element to initiate an online meeting in the second web-delivered shared environment with a first portion of the one or more members of the workspace, and (b) in a second operating condition, a second user interface element to join an ongoing online meeting in the second web-delivered shared environment with a second portion of the one or more members; and
   in response to initiation of an online meeting by activation of the first user interface element and to joining of an online meeting by activation of the second interface element, receiving meeting descriptive information and meeting content for the online meeting from the second web-delivered shared environment and displaying the meeting descriptive information and meeting content for the online meeting in the representation of the meeting resources of the workspace display,
   wherein the second user interface element is coupled with a thumbnail of a screen sharing view or webcam view from the ongoing online meeting.

2. The method of claim 1, wherein the thumbnail comprises a still image snapshot.

3. The method of claim 1, wherein the thumbnail comprises an updating sequence of snapshots.

4. The method of claim 1, wherein the second user interface is coupled with a graphical representation of one or more discussion topics of the ongoing online meeting.

5. The method of claim 4, wherein the graphical representation comprises text from the ongoing online meeting.

6. The method of claim 1, wherein the second user interface element is coupled with a graphical representation of one or more attendees of the ongoing online meeting.

7. The method of claim 6, wherein the graphical representation comprises a video representation.

8. The method of claim 1, wherein the workspace display associated with the workspace is provided within a web browser.

9. The method of claim 1, wherein the workspace display associated with the workspace comprises plural user interface elements to join plural ongoing online meetings.

10. The method of claim 1, wherein providing access to the workspace includes:
    receiving the content items as uploads from the members and storing the content items as part of the workspace for access by the members via the workspace display; and
    receiving comments written by the members and storing the comments as part of the workspace for displaying to the members via the workspace display.

11. The method of claim 1, wherein the workspace display includes a central area and a peripheral area, the central area displaying the content items and providing for user interaction with the workspace, the peripheral area displaying the representation of the meeting resources including the first and second user interface elements for initiating and joining online meetings.

12. A non-transitory computer-readable medium for providing a workspace, the computer-readable medium comprising instructions which, when executed by one or more computers, cause the one or more computers to implement a method, the method comprising:
    providing, to a client computing device, access to a workspace, the workspace comprising one or more members and one or more content items, the workspace being a first web-delivered shared environment for the members of the workspace to collaborate asynchronously by sharing access to the content items, the access being provided in response to verifying that the client computing device is associated with one of the one or more members of the workspace;
    providing, to the client computing device, a workspace display associated with the workspace, the workspace display including (1) a representation of remote resources of the workspace including the content items, (2) a representation of the members of the workspace, and (3) a representation of meeting resources for online meetings that can be initiated and joined by the one member via the workspace display, the online meetings provided by an online meeting tool in a second web-delivered shared environment providing real-time video and/or audio interaction among online meeting participants, the representation of the meeting resources in the workspace display being connected to receive online meeting information from the second web-delivered shared environment and including (a) in a first operating condition, a first user interface element to initiate an online meeting in the second web-delivered shared environment with a first portion of the one or more members of the workspace, and (b) in a second operating condition, a second user interface element to join an ongoing online meeting in the second web-delivered shared environment with a second portion of the one or more members; and
    in response to initiation of an online meeting by activation of the first user interface element and to joining of an online meeting by activation of the second interface element, receiving meeting descriptive information and meeting content for the online meeting from the second web-delivered shared environment and displaying the meeting descriptive information and meeting content for the online meeting in the representation of the meeting resources of the workspace display,
    wherein the second user interface element is coupled with a thumbnail of a screen sharing view or webcam view from the ongoing online meeting.

13. The computer-readable medium of claim 12, wherein the thumbnail comprises a still image snapshot.

14. The computer-readable medium of claim 12, wherein the thumbnail comprises an updating sequence of snapshots.

15. The computer-readable medium of claim 12, wherein the second user interface is coupled with a graphical representation of one or more discussion topics of the ongoing online meeting.

16. The computer-readable medium of claim 15, wherein the graphical representation comprises text from the ongoing online meeting.

17. The computer-readable medium of claim 12, wherein the second user interface element is coupled with a graphical representation of one or more attendees of the ongoing online meeting.

18. The computer-readable medium of claim 17, wherein the graphical representation comprises a video representation.

19. The computer-readable medium of claim 12, wherein the workspace display associated with the workspace is provided within a web browser.

20. The computer-readable medium of claim 12, wherein the workspace display associated with the workspace comprises plural user interface elements to join plural ongoing online meetings.

21. A system for providing a workspace, the system comprising:
    one or more processors; and
    a memory comprising instructions which, when executed by the one or more processors, cause the one or more processors to implement a method, the method comprising:
        providing, to a client computing device, access to a workspace, the workspace comprising one or more members and one or more content items, the workspace being a first web-delivered shared environment for the members of the workspace to collaborate asynchronously by sharing access to the content items, the access being provided in response to verifying that the client computing device is associated with one of the one or more members of the workspace;
        providing, to the client computing device, a workspace display associated with the workspace, the workspace display including (1) a representation of remote resources of the workspace including the content items, (2) a representation of the members of the workspace, and (3) a representation of meeting resources for online meetings that can be initiated and joined by the one member via the workspace display, the online meetings provided by an online meeting tool in a second web-delivered shared environment providing real-time video and/or audio interaction among online meeting participants, the representation of the meeting resources in the workspace display being connected to receive online meeting information from the second web-delivered shared environment and including (a) in a first operating condition, a first user interface element to initiate an online meeting in the second web-delivered shared environment with a first portion of the one or more members of the workspace, and (b) in a second operating condition, a second user interface element to join an ongoing online meeting in the second web-delivered shared environment with a second portion of the one or more members; and in response to initiation of an online meeting by activation of the first user interface element and to joining of an online meeting by activation of the second interface element, receiving meeting descriptive information and meeting content for the online meeting from the second web-delivered shared environment and displaying the meeting descriptive information and meeting content for the online meeting in the representation of the meeting resources of the workspace display, wherein the second user interface element is coupled with a thumbnail of a screen sharing view or webcam view from the ongoing online meeting.

* * * * *